(12) United States Patent
Meiselman (10) Patent No.: US 10,136,684 B2
(45) Date of Patent: Nov. 27, 2018

(54) MOLDED WATERSPORTS AND COLD CLIMATE ACCESSORIES

(71) Applicant: Solite Innovations LLC, Westfield, NJ (US)

(72) Inventor: James Alexander Meiselman, Westfield, NJ (US)

(73) Assignee: SOLITE INNOVATIONS LLC, Westfield, NJ (US)

( * ) Notice: Subject to any disclaimer, the term of this patent is extended or adjusted under 35 U.S.C. 154(b) by 183 days.

(21) Appl. No.: 14/332,703

(22) Filed: Jul. 16, 2014

(65) Prior Publication Data
US 2015/0059047 A1    Mar. 5, 2015

Related U.S. Application Data

(60) Provisional application No. 61/870,387, filed on Aug. 27, 2013.

(51) Int. Cl.
*A43B 7/12*    (2006.01)
*A41D 13/012*    (2006.01)
(Continued)

(52) U.S. Cl.
CPC ......... *A41D 13/012* (2013.01); *A41D 13/081* (2013.01); *A41D 19/0006* (2013.01); *A43B 1/14* (2013.01); *A43B 5/08* (2013.01); *A43B 9/12* (2013.01); *B29C 65/48* (2013.01); *B29C 66/02241* (2013.01); *B29C 66/0382* (2013.01); *B29C 66/1222* (2013.01); *B29C 66/1226* (2013.01); *B29C 66/43* (2013.01); *B29C 66/727* (2013.01); *B29C 66/7292* (2013.01); *B29C 66/72343* (2013.01); *B29D 35/126* (2013.01);
(Continued)

(58) Field of Classification Search
CPC .. A41D 13/05; A41D 13/012; A41D 19/0006; A41D 2500/54; A43B 1/10; A43B 5/08; A43B 7/12; A43B 7/125; A43B 7/14; A43B 13/187; A43B 13/22; A43B 13/223; A43B 13/24; A43B 19/00; A43B 23/022; A43B 23/06; A43C 15/00; B29D 35/10; B29C 2500/54
USPC ...... 36/14, 55, 11.5, 8.1, 58.5, 94, 103, 113, 36/116, 59 C; 2/22, 23, 239, 240, 241, 2/242
See application file for complete search history.

(56) References Cited

U.S. PATENT DOCUMENTS 538,270 A * 4/1895 Nelson .................... A43B 23/28
                                                36/58.5
2,129,226 A * 9/1938 Montano ................. A43B 5/08
                                                36/8.1
(Continued)

OTHER PUBLICATIONS

Search report & written opinion for related PCT application, PCT/US2015/037143, dated Sep. 15, 2015 (16 pages).

*Primary Examiner* — Jameson Collier
*Assistant Examiner* — James Heracklis
(74) *Attorney, Agent, or Firm* — Abelman, Frayne & Schwab (57) ABSTRACT

Watersports accessories, including but not limited to handwear and footwear, where a substantial portion of the accessory is molded in a three-dimensional mold with a soft, pliable, and durable material such as EVA (Ethylene Vinyl Acetate) or PU (Polyurethane) or similar foam blends that aid in the flexibility, durability, and comfort of the accessory.

18 Claims, 6 Drawing Sheets

(51) Int. Cl.
  *B29C 65/48* (2006.01)
  *A43B 5/08* (2006.01)
  *A41D 13/08* (2006.01)
  *A41D 19/00* (2006.01)
  *B29C 65/00* (2006.01)
  *A43B 1/14* (2006.01)
  *A43B 9/12* (2006.01)
  *B29D 35/12* (2010.01)
  *B29K 105/04* (2006.01)
  *B29K 75/00* (2006.01)
  *B29K 23/00* (2006.01)
  *B29K 105/00* (2006.01)
  *B29L 31/48* (2006.01)
  *B29L 31/50* (2006.01)

(52) U.S. Cl.
  CPC .......... *A41D 2500/54* (2013.01); *B29C 66/71* (2013.01); *B29K 2023/083* (2013.01); *B29K 2075/00* (2013.01); *B29K 2105/0085* (2013.01); *B29K 2105/04* (2013.01); *B29L 2031/4864* (2013.01); *B29L 2031/50* (2013.01)

(56) References Cited

U.S. PATENT DOCUMENTS

| | | | | |
|---|---|---|---|---|
| 2,297,656 | A * | 9/1942 | L Hollier | A43B 3/16 36/55 |
| 2,581,728 | A * | 1/1952 | Spack | A41B 11/007 12/142 F |
| 2,651,853 | A * | 9/1953 | Lewis | A01K 13/007 36/111 |
| 2,724,676 | A * | 11/1955 | Randall | A43B 3/02 12/142 E |
| 2,749,551 | A * | 6/1956 | Garbellano | B63C 11/04 2/2.15 |
| 3,013,564 | A * | 12/1961 | Levey | A43B 7/26 2/240 |
| 4,170,802 | A * | 10/1979 | Roy | A43B 13/39 12/142 RS |
| 4,282,657 | A * | 8/1981 | Antonious | A43B 5/00 24/306 |
| 4,294,022 | A * | 10/1981 | Stockli | A43B 1/10 36/4 |
| 4,333,192 | A * | 6/1982 | Stockli | A43B 1/10 12/142 E |
| D273,624 | S * | 5/1984 | Finch | D2/911 |
| 4,503,566 | A * | 3/1985 | Wheeler | A41D 17/00 2/22 |
| 4,599,812 | A * | 7/1986 | Harmsen | A61F 13/085 2/239 |
| 4,649,656 | A * | 3/1987 | Cox | A43B 5/08 36/114 |
| 4,833,795 | A * | 5/1989 | Diaz | A43B 13/184 36/11.5 |
| 4,845,862 | A * | 7/1989 | Phillips, Jr. | A43B 1/14 36/4 |
| 4,896,438 | A * | 1/1990 | DeBease | A43B 3/02 36/7.1 R |
| 4,907,350 | A * | 3/1990 | Chilewich | A43B 9/08 12/142 A |
| 4,967,494 | A * | 11/1990 | Johnson | A41B 11/005 2/239 |
| 5,020,164 | A * | 6/1991 | Edwards | A41B 11/00 2/239 |
| 5,325,541 | A * | 7/1994 | Willard | A41B 11/005 2/239 |
| 5,617,585 | A * | 4/1997 | Fons | A41B 11/007 2/239 |
| 5,685,091 | A * | 11/1997 | Yalamanchili | A43B 7/125 36/10 |
| 5,697,106 | A * | 12/1997 | Baker | A41B 11/00 2/239 |
| 5,774,898 | A * | 7/1998 | Malpee | A41B 11/004 2/22 |
| 5,778,566 | A * | 7/1998 | Edauw | A43B 5/0405 36/117.1 |
| 5,855,079 | A * | 1/1999 | Herbert | A43B 3/0047 36/10 |
| 5,913,592 | A * | 6/1999 | Moore | A43B 7/26 36/4 |
| 6,016,575 | A * | 1/2000 | Prychak | A41B 11/004 2/239 |
| 6,105,173 | A * | 8/2000 | Brown | A41B 11/00 2/239 |
| 6,115,940 | A * | 9/2000 | Chen | A43B 7/12 12/142 E |
| 6,408,540 | B1 * | 6/2002 | DeKalb | A43B 5/08 36/3 A |
| 6,446,360 | B1 * | 9/2002 | Sheets | A43B 7/125 12/142 T |
| 6,474,001 | B1 * | 11/2002 | Chen | A43B 7/12 36/14 |
| 6,474,002 | B2 * | 11/2002 | Chen | A43B 7/125 36/14 |
| 6,665,954 | B2 * | 12/2003 | Chen | A43B 3/02 36/3 A |
| 6,836,979 | B2 * | 1/2005 | Flavio | A43B 3/26 12/142 E |
| 6,880,268 | B2 * | 4/2005 | Chen | A41B 11/007 36/10 |
| 6,935,053 | B2 * | 8/2005 | Wiener | A43B 7/125 36/14 |
| 7,017,284 | B2 * | 3/2006 | Keidel | A43B 7/125 36/14 |
| 7,107,702 | B1 * | 9/2006 | Chavez | A43B 5/08 36/3 B |
| 7,219,443 | B2 * | 5/2007 | Czaplewski | A41D 17/00 36/2 R |
| D548,938 | S * | 8/2007 | Belley | D2/923 |
| 7,264,599 | B1 * | 9/2007 | Milligan | A43B 3/0005 36/141 |
| 7,346,936 | B2 * | 3/2008 | Vargas | A41B 11/02 2/239 |
| 7,370,438 | B2 * | 5/2008 | Vattes | A43B 7/1465 36/10 |
| D582,134 | S * | 12/2008 | Von Conta | A43B 7/26 D2/903 |
| 7,814,681 | B2 * | 10/2010 | Wasserman | A43B 7/082 36/3 A |
| 7,891,116 | B1 * | 2/2011 | Iglikov | A43B 23/0205 36/4 |
| 7,930,841 | B2 * | 4/2011 | Luedecke | A43B 5/08 36/113 |
| D639,535 | S * | 6/2011 | Eggert | A43B 7/26 D2/898 |
| 7,971,374 | B2 * | 7/2011 | Hernandez | A43B 1/0081 36/129 |
| 8,156,947 | B2 * | 4/2012 | Viola | A45D 29/00 132/200 |
| D658,868 | S * | 5/2012 | Chenciner | D2/969 |
| 8,209,884 | B2 * | 7/2012 | McClaskie | A43B 9/02 12/142 C |
| D674,171 | S * | 1/2013 | Bramani | D2/902 |
| 8,371,042 | B2 * | 2/2013 | Matalon | A43B 13/26 36/112 |
| 8,429,836 | B1 * | 4/2013 | Tomor | A43B 1/0081 36/100 |
| D682,514 | S * | 5/2013 | Lamstein | D2/908 |
| 8,438,756 | B2 * | 5/2013 | Kelley | A43B 3/244 36/100 |
| 8,516,721 | B2 * | 8/2013 | Mahoney | A43B 7/1425 36/102 |
| 8,671,588 | B2 * | 3/2014 | Hampton | A43B 3/0078 36/7.1 R |
| 8,726,540 | B2 * | 5/2014 | Crowley, II | A43B 1/0009 36/103 |
| 8,991,075 | B2 * | 3/2015 | Chenciner | A43C 1/06 36/8.1 |

(56) References Cited

U.S. PATENT DOCUMENTS

| | | | | |
|---|---|---|---|---|
| D728,902 S * | 5/2015 | Conchieri | | D2/902 |
| D730,021 S * | 5/2015 | Conchieri | | D2/902 |
| D756,613 S * | 5/2016 | Bramani | | D2/898 |
| 9,498,023 B2 * | 11/2016 | Craig | | A43B 1/04 |
| 2002/0010957 A1 * | 1/2002 | Katz | | A41D 19/01 |
| | | | | 2/161.7 |
| 2003/0097766 A1 * | 5/2003 | Morgan | | A43B 5/04 |
| | | | | 36/10 |
| 2003/0167653 A1 * | 9/2003 | DeKalb | | A43B 5/08 |
| | | | | 36/8.1 |
| 2003/0167656 A1 * | 9/2003 | Tung | | A43B 7/125 |
| | | | | 36/55 |
| 2004/0128863 A1 * | 7/2004 | Hong | | A43B 3/24 |
| | | | | 36/100 |
| 2004/0139629 A1 * | 7/2004 | Wiener | | A43B 7/125 |
| | | | | 36/12 |
| 2005/0091729 A1 * | 5/2005 | Alley | | A41B 11/004 |
| | | | | 2/239 |
| 2005/0166427 A1 * | 8/2005 | Greene | | A43B 3/0026 |
| | | | | 36/128 |
| 2006/0143944 A1 * | 7/2006 | Collins | | A43B 5/08 |
| | | | | 36/8.1 |
| 2006/0174517 A1 * | 8/2006 | Chang | | A43B 7/12 |
| | | | | 36/55 |
| 2007/0039210 A1 * | 2/2007 | Clark | | A43B 1/0045 |
| | | | | 36/113 |
| 2007/0062067 A1 * | 3/2007 | Covatch | | A43B 3/24 |
| | | | | 36/55 |
| 2007/0144039 A1 * | 6/2007 | Fliri | | A43B 1/10 |
| | | | | 36/94 |
| 2007/0204482 A1 * | 9/2007 | Gibson-Collinson | | |
| | | | | A43B 5/0405 |
| | | | | 36/10 |
| 2008/0110051 A1 * | 5/2008 | Min | | A43B 7/12 |
| | | | | 36/55 |
| 2008/0201823 A1 * | 8/2008 | Jaeger | | A41D 19/01529 |
| | | | | 2/168 |
| 2008/0216354 A1 * | 9/2008 | Morlacchi | | A43B 7/125 |
| | | | | 36/98 |
| 2008/0229614 A1 * | 9/2008 | Santa Ana | | A43B 1/0054 |
| | | | | 36/100 |
| 2008/0313929 A1 * | 12/2008 | Hoyt | | A43B 1/10 |
| | | | | 36/105 |
| 2009/0031582 A1 * | 2/2009 | Lu | | A43B 9/02 |
| | | | | 36/10 |
| 2009/0083996 A1 * | 4/2009 | Clancy | | A43B 5/08 |
| | | | | 36/88 |
| 2009/0083998 A1 * | 4/2009 | Luedecke | | A43B 5/08 |
| | | | | 36/89 |
| 2010/0151176 A1 * | 6/2010 | Ly | | A41H 43/04 |
| | | | | 428/61 |
| 2011/0005105 A1 * | 1/2011 | Hong | | A43B 5/08 |
| | | | | 36/3 B |
| 2011/0023215 A1 * | 2/2011 | Obradovic | | A43B 3/16 |
| | | | | 2/239 |
| 2011/0061149 A1 * | 3/2011 | Polacco | | A41B 11/004 |
| | | | | 2/241 |
| 2011/0061266 A1 * | 3/2011 | Hsieh | | A43B 7/141 |
| | | | | 36/107 |
| 2011/0119956 A1 * | 5/2011 | Borel | | A43B 9/02 |
| | | | | 36/44 |
| 2011/0265233 A1 * | 11/2011 | Shiue | | A41D 13/012 |
| | | | | 2/2.15 |
| 2011/0265241 A1 * | 11/2011 | Shiue | | A41D 13/012 |
| | | | | 2/69 |
| 2012/0055042 A1 * | 3/2012 | Polegato Moretti | | A43B 7/08 |
| | | | | 36/83 |
| 2012/0117821 A1 * | 5/2012 | Adams | | A43B 3/0052 |
| | | | | 36/58.5 |
| 2012/0151806 A1 * | 6/2012 | Polegato Moretti | | A43B 7/06 |
| | | | | 36/3 B |
| 2012/0266359 A1 * | 10/2012 | Gellis | | A41D 19/0065 |
| | | | | 2/168 |
| 2012/0272548 A1 * | 11/2012 | Downard | | A43B 13/38 |
| | | | | 36/107 |
| 2013/0047460 A1 * | 2/2013 | Turner | | A43B 3/16 |
| | | | | 36/7.1 R |
| 2013/0047471 A1 * | 2/2013 | Liang | | A43D 86/00 |
| | | | | 36/136 |
| 2013/0055589 A1 * | 3/2013 | Lombardi | | A43B 5/08 |
| | | | | 36/8.1 |
| 2013/0086817 A1 * | 4/2013 | Myerscough | | A43B 3/00 |
| | | | | 36/114 |
| 2013/0118031 A1 * | 5/2013 | Chenciner | | A43C 1/06 |
| | | | | 36/88 |
| 2014/0202035 A1 * | 7/2014 | Goldman | | A43B 7/12 |
| | | | | 36/84 |
| 2015/0059047 A1 * | 3/2015 | Meiselman | | A41D 19/0006 |
| | | | | 2/67 |

\* cited by examiner

MOLDED WATERSPORTS AND COLD CLIMATE ACCESSORIES

RELATED APPLICATIONS

The present application claims the benefit of U.S. Provisional Patent Application No. 61/870,387 filed on 27 Aug. 2013, the disclosure of which is incorporated herein by reference in its entireties.

FIELD OF THE INVENTION

The invention refers to watersports accessories, including but not limited to handwear and footwear, where a substantial portion of the accessory is molded in a three-dimensional mold with a soft, pliable, and durable material such as EVA (Ethylene Vinyl Acetate) or PU (Polyurethane) or similar foam blends that aid in the flexibility, durability, and comfort of the accessory.

BACKGROUND OF THE INVENTION

Historically, watersports accessories, particularly handwear and footwear, have been constructed with flat neoprene foam and rubber components which are glued, stitched, and vulcanized in an appropriate shape to form the complete product. These products, while adequate in providing flexibility, comfort, and warmth to the user, often suffer from durability problems, particularly in the seams, where water can leak into the product, making the user cold, trapping water, and making the hands and feet of the user feel heavier and be subject to increased fatigue due to the additional weight of the trapped water.

What is required are watersports accessories that are lightweight, that limit the entry of water to the user's skin, as well as limiting the absorbance of water into the accessories themselves.

SUMMARY OF THE INVENTION

The present invention comprehends a substantial improvement in the comfort, weight, warmth, dexterity and durability of these watersports accessories by utilizing a three-dimensional mold to produce a substantial portion of the handwear or footwear. Several different existing molding techniques can effectively be used, including but not limited to: EVA foam injection molding, EVA compression molding, or Polyurethane poured foam molding. The final product should have a generally soft durometer, preferably below 35 Asker C, for comfort and flexibility. This molded process minimizes the use of seams to manufacture the product, thereby substantially improving the durability of the product and reducing the likelihood of leaks.

In addition, this molding process allows for a variable thickness profile of the product to improve flexibility, dexterity, targeted insulation, and performance for the desired use. For example, areas that require increased flexibility, such as finger, wrist, and ankle joints, can be molded thinner than the areas that can remain thicker for more insulation. In traditional watersports accessory production, these changes in thickness require stitching together different thickness sheets of neoprene, which results in an abrupt thickness change and requires additional seams and stitching, all of which are subject to leaking, require additional manufacturing steps, and increase production cost. In contrast, the three-dimensional molding process of this invention allows a targeted tapering or increasing of thickness for increased comfort and precise control of the thickness profile of the product. This molded process also eliminates undesirable seams, which improves comfort, flexibility and durability of the product while reducing weight and production cost.

An additional benefit of the use of molded foam construction is substantially improved abrasion resistance, particularly with the injected EVA molding process. When it cures in the mold, the outer "skin" of the injected EVA is very resistant to abrasion, and unlike raw neoprene, does not require the lamination of a more durable outer material (such as nylon or polyester fabric) to provide abrasion resistance. These laminated fabrics also tend to absorb water and become heavy and cumbersome during use. Elimination of an additional outer skin or layer reduces manufacturing complexity and production cost.

Another benefit to the use of molded foam construction is the ability to mold strategic textures on the exterior surface of the product. One example is to mold a rough or high-surface-area pattern in the palm of a watersports glove to improve gripping ability. As another example, textures can be molded in the sole of a watersports boot to improve traction. Since these textures are integrated into the mold, there is substantial savings in cost versus the current methods of gluing, laminating, or printing additional grip/traction elements on neoprene hand-wear and footwear. Cosmetic textures and logos can also be integrated into the mold to improve the appearance and marketability of the product.

Another benefit to the use of molded foam construction is the ability to mold strategic textures on the inside of the product. For example, the molding of a high-friction pattern on the internal sole of a boot provides grip against the user's foot to prevent slipping/sliding of the foot inside the boot. A similar high-friction texture can be molded on the inside of a glove to prevent the fingers/hands from slipping inside the glove, and also to provide channels for air-flow to improve warmth of the product.

Another benefit to the use of molded foam construction is the hydrophobic and antibacterial properties of the material. The foam materials contemplated in the invention are closed-cell structure and are impermeable to water absorption. Neoprene accessories, particularly those with an outer lining material such as nylon or polyester, absorb water and thus become heavier and more cumbersome for the user. Molded foam boots and gloves do not absorb water, therefore are lighter/dryer during use, and also dry much quicker when not in use. Typically neoprene accessories with internal and/or external fabric lining materials take hours or even days to dry, leading to formation of bacteria and unpleasant odor. This bacterium also causes premature breakdown of the product. The surface of molded foam boots/gloves can be dried instantly with a wipe of a dry towel, increasing the longevity of the product by preventing formation of bacteria, and making the boot more comfortable/warm when putting on shortly after a previous use.

An additional element contemplated in the invention is the integration of a more flexible cuff or gusset, such as in the wrist or ankle portion, that allows easier entry and exit of the hand or foot into the component. This cuff or gusset can be made with a high-stretch material such as neoprene, and bonded to the product with suitable wetsuit manufacturing techniques such as glue, stitch, and seam sealing.

Another element contemplated in the invention is the use of a comfortable inner lining material, such as the elastane polyester, nylon, hollow-fiber, bamboo fiber, or stretch fleece materials that are commonly used as lining for watersports wetsuits and accessories. These materials can be bonded to the inside of the high-stretch material, and also can be bonded to the inside of the molded foam material, in both cases using hot-melt glue or other suitable bonding techniques. The melt-temperature of the hot-melt glue used must be lower than the distortion temperature of the foam to avoid damage to the molded component. This inner lining material increases warmth, comfort, and eases the process of entry and exit of the hand or foot from the product. Typically this lining material can be bonded to the inside of the molded component immediately after the component emerges from the injection mold, while the component is still hot enough to melt the hot-melt glue.

Another element contemplated in the invention is the integration of two or more colors and/or durometers of foam simultaneously injected in the mold to enhance the appearance and/or performance of the product. One embodiment is the injection of a higher durometer and/or different color foam in the sole area of a watersports boot. This sole component provides additional protection and abrasion resistance from rough surfaces such as sand, rocks, or reef. Typically the addition of a durable sole requires additional steps in manufacturing such as gluing a separate rubber component to the sole. The multiple-injection process described above allows this process to be achieved and produces a strong, flexible, molecular bond between the two materials.

In another embodiment, this multiple-injection process is used for cosmetic purposes such as the injection of a different color logo or other graphical element to the product.

In yet another embodiment, a firmer durometer material is injected into the arch area of the footwear to provide additional arch support for high-stress activities.

Another element contemplated in the invention, particularly footwear, is the bonding of strategic sole materials, such as rubber, to the sole portion of the molded component to enhance traction, durability, and puncture resistance of the sole. For fly-fishing applications, commonly used materials such as felt can be bonded to the sole for additional traction on slippery rocks in rivers. These sole materials can be one piece, or multiple pieces, depending on the use and style of the product.

Another element contemplated in the invention, particularly footwear, is the integration of an adjustable tension strap, using hook-and-loop, buckles, or other appropriate adjustment means, to provide additional security and tighter fit over the top of the foot. In one embodiment, webbing is placed under and around the heel portion of the sole, ending at fasteners such as D-rings at the inside and outside edges of the footwear. An adjustable tension strap such as hook-and-loop material is attached to one fastener, such as by stitching the strap to itself, and being of sufficient length that a user of the footwear can put on the footwear, run the free end of the strap over the top of the boot and down to the second fastener, and secure the free end of the strap at the second fastener. The adjustable-tension strap can be secured at the second fastener in a number of ways. For example, a hook-and-loop strap can be attached to itself. Other types of straps can be secured with a second fastener that is a buckle with a keeper, or with a second fastener that is a slide, etc. The placement and securing of the webbing under the heel of the footwear ensures that when the adjustable-tension strap is tightened, the webbing does not distort or stress the materials on the side of the boot. This contrasts with the prior art watersports boots that have a tension strap glued and/or stitched to the side of the boot, and when tensioned, the straps pull and distort the material on the side of the boots, causing premature deterioration of the materials and seams.

In another element, the fasteners at either end of the webbing material are triangle-shaped rings that change the angle of the adjustable tension strap. The triangle rings orient the tension strap over the top of the foot, below the ankle, to insure comfort and retain full mobility of the ankle joint.

In another embodiment of a manufacturing method, hot-air blowers provide a custom fit to the end user. This is particularly applicable to EVA components, which are thermo-formable at a temperature of approximately 100 C./220 F. There are specially made hot-air blowers for this application, but hot-air guns and hair-dryers can also be used. This process can be conducted, e.g., in a retail store where the handwear and footwear is sold. In this application, the boots and/or gloves are heated with warm air for approximately 10-15 minutes, or until the molded material becomes thermoformable. The boots/gloves are removed from the hot air source and placed on the user. After the boots/gloves cool down to body temperature, they are permanently molded to fit the user's hands and/or feet. These components can also be re-heated and re-molded with the same process multiple times.

In another embodiment, a substantially stiffer arch support component, such as an injection molded TPU arch, is bonded to the arch area of the sole of the molded boot. This stiffer arch provides additional support and stability for activities with sustained arch strain such as stand-up paddle boarding, wakeboarding, kite boarding, and sailboarding.

In another embodiment, a glove of the invention can be manufactured integrated with a garment covering a greater part of a user's body, such as a shirt, an apron, etc. In another embodiment, a boot of the invention can be manufactured integrated with a garment covering a greater part of a user's body, such as pants, coveralls, a wetsuit, a drysuit, etc.

Although the description of the invention primarily describes hand-wear and footwear, the same three dimensionally molded components could also be integrated into other watersports equipment. One example is for use in strategic areas of wetsuits. Areas subject to high abrasion, such as the chest/stomach area and the knees, could integrate molded EVA foam panels for increased durability and less water absorption.

BRIEF DESCRIPTION OF THE DRAWINGS

Preferred embodiments of the invention are described herein below with reference to the drawings wherein.

DETAILED DESCRIPTION OF THE INVENTION

The invention includes a watersports garment for an extremity, including a terminal portion constructed from molded foam, such as EVA, PU, or similar foam blends, and a subterminal portion constructed from a high-stretch, water-resistant material, such as neoprene. In an alternate embodiment, the subterminal portion can be a perforated neoprene or nylon/polyester mesh that allows free flow of water in/out of the product. In another alternate embodiment, the subterminal portion can be a water-proof fabric such as nylon or a waterproof/breathable fabric such as GORE-TEX.

Figure 1:
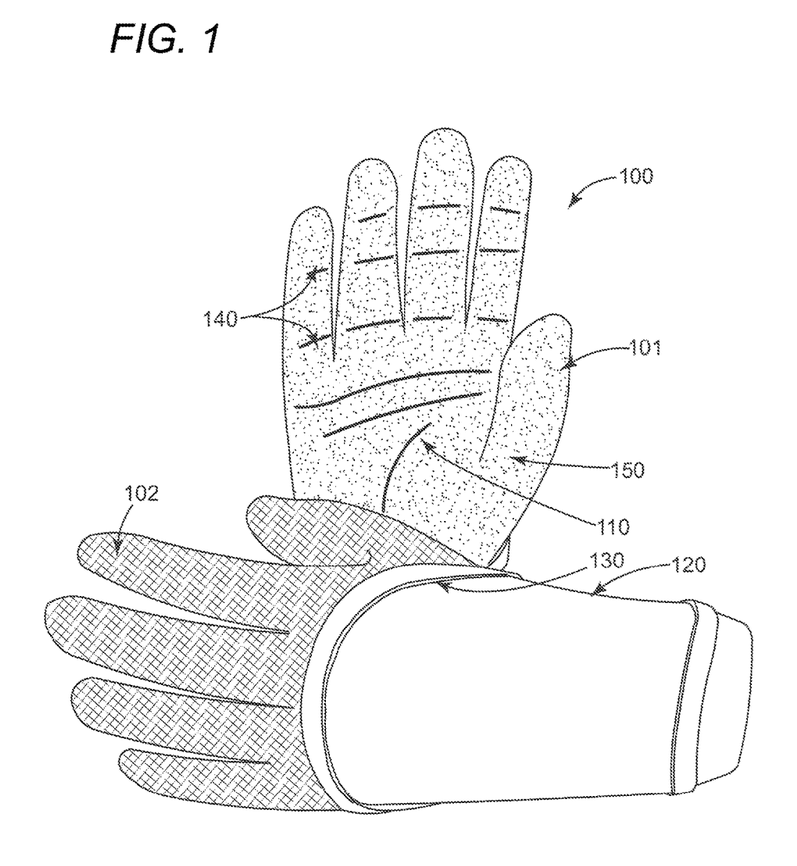
FIG. 1 illustrates a pair of gloves.

FIG. 1 illustrates one embodiment of the invention, wherein the extremity is a hand, and the garment is a pair of gloves 100. Right glove 101 is oriented to show the palm, while left glove 102 is oriented to show the back of the glove. The terminal portion is a palm portion 110, representing the front and back of the fingers of the gloves, as well as the palm. The subterminal portion is a wrist portion 120, which covers the back of the hand, excluding the fingers, and covers the front and back of the wrist.

The palm portion 110 includes flex grooves 140 molded into the front of the fingers and palm to enhance flexibility. In addition, the palm portion 110 includes texturing 150 on both the interior and exterior surfaces of the front and back of the fingers and hands, providing for an enhanced grip, i.e., so that the fingers do not slip within the gloves 100, and so that the gloves themselves do not slip when grasping an object.

A lining fabric 160 (illustrated in FIG. 2) is provided within the interior of the wrist portion 120 of the gloves 100. Note that in another embodiment, not illustrated, a lining fabric is provided within the palm portion to provide additional warmth and/or comfort.

Figure 2:
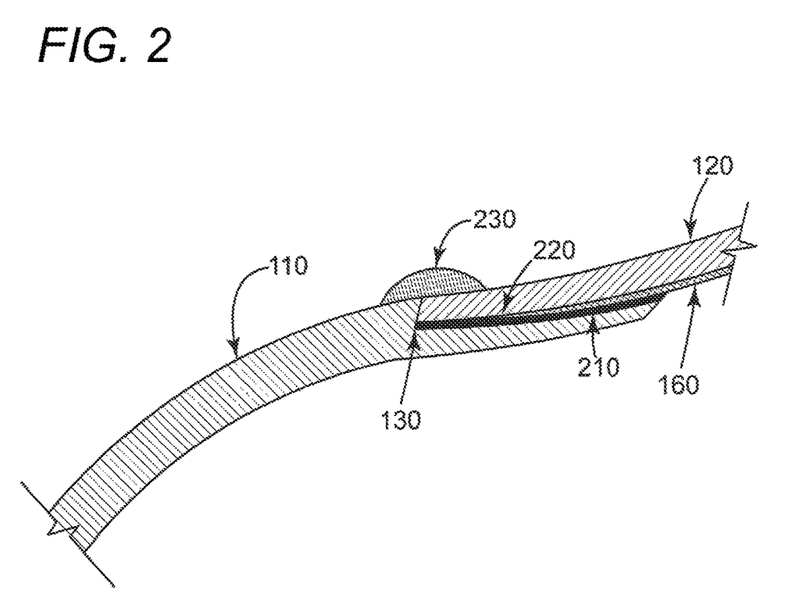
FIG. 2 illustrates the seam construction of a glove.

As FIG. 2 illustrates, the wrist portion 120 is attached to the palm portion 110 at a seam 130, using waterproof glue 210 commonly used in wetsuit construction. A thin lip runs around the entire bonding surface of the EVA components to accept the neoprene.

The neoprene of wrist portion 120 includes a skived surface 220 that cuts at an angle through lining fabric 160 through to the raw neoprene. Waterproof glue 210 is bonded to the raw neoprene of the skived surface, producing a very strong bond, and is also bonded to lining fabric 160. Lining fabric 160 is much stronger than the raw neoprene of wrist portion 120 against tearing from stretching.

An external seam sealant 230 is applied to the external surface of seam 130 between the palm portion 110 and wrist portion 120 to provide additional water-proofing and seam strength. This is a silicone- or polyurethane-based sealant that is applied with a syringe in viscous form and which cures at room temperature.

Figure 3:
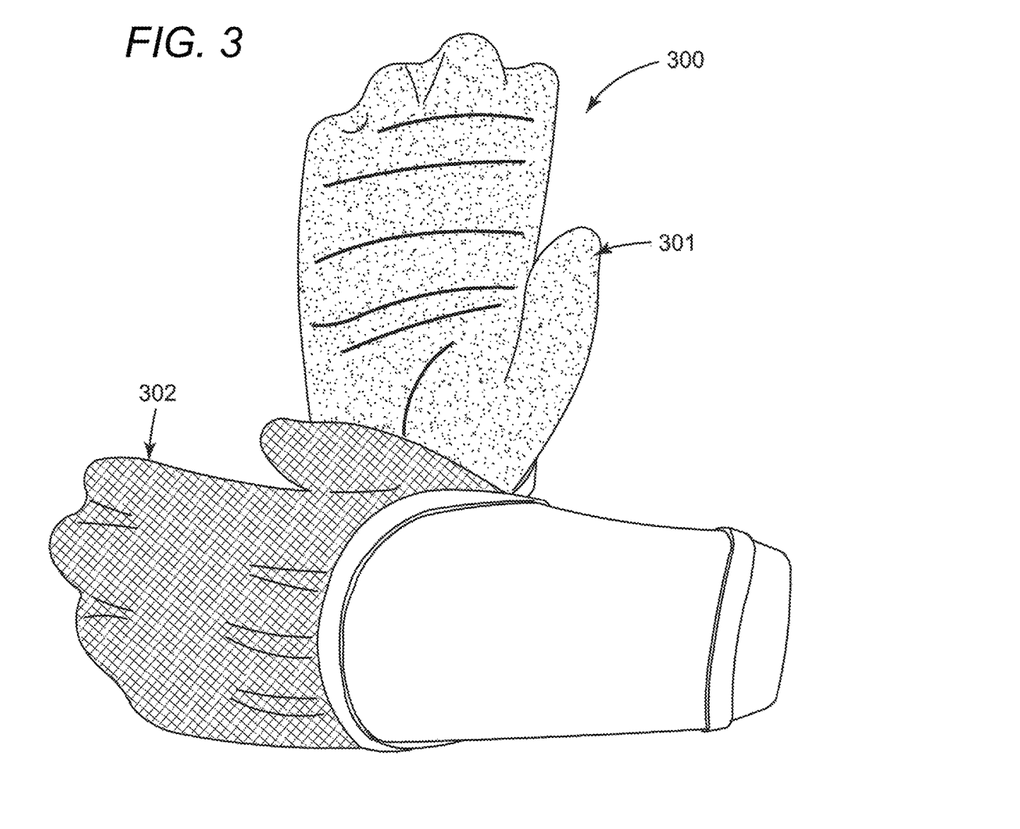
FIG. 3 illustrates a pair of mittens.

FIG. 3 illustrates a pair of mittens 300, representing another embodiment of the invention. Right glove 301 is oriented to show the palm, while left glove 302 is oriented to show the back of the glove. In this embodiment, the second through fifth fingers of each glove are joined together into a common compartment.

With mittens, fingers are able to share warmth, though the tradeoff is a loss of dexterity. In yet another embodiment, not illustrated, modified mittens provide for independent pockets for the thumb and second finger, but group together the third through fifth fingers.

Figure 4:
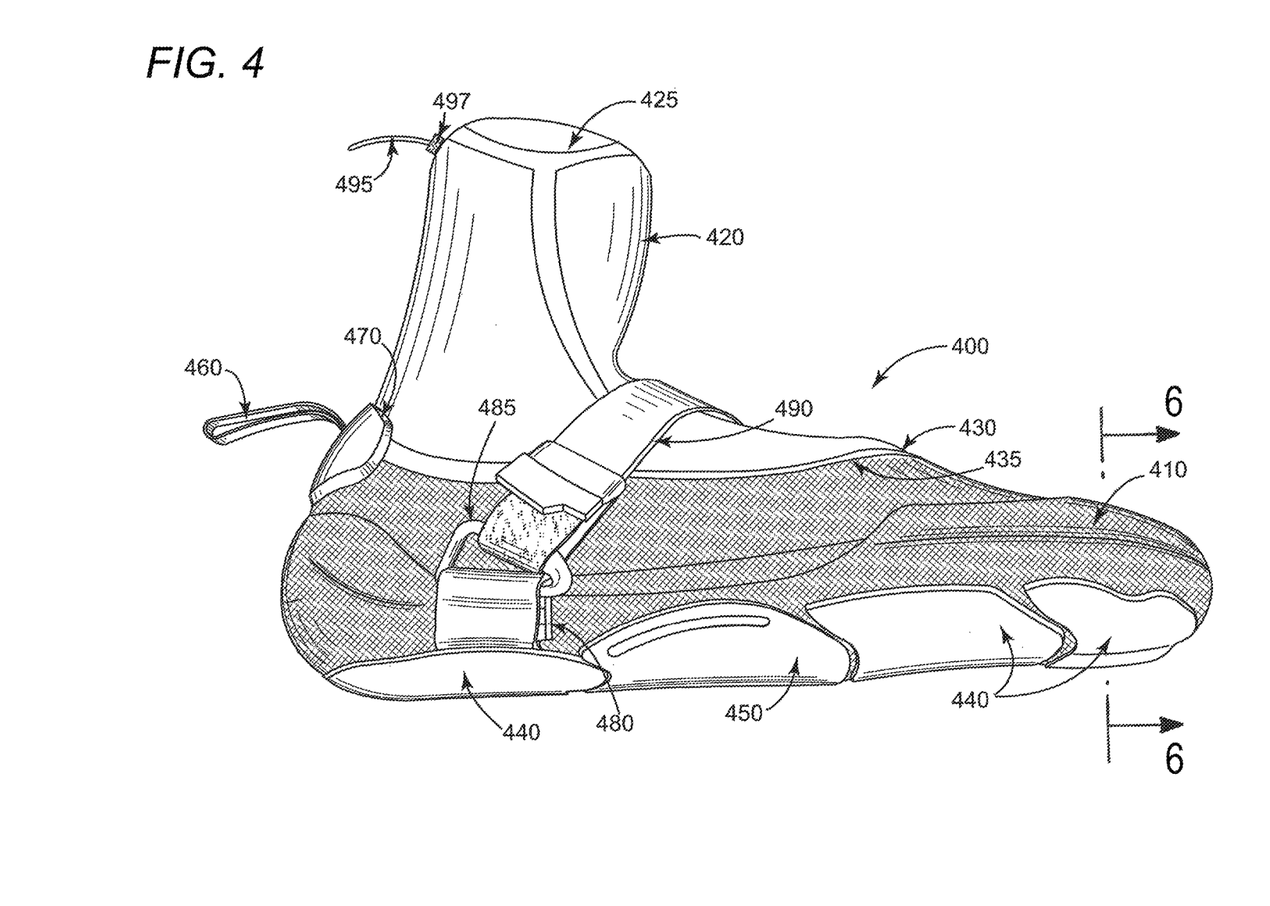
FIG. 4 illustrates a boot.

FIG. 4 illustrates another embodiment of the invention, wherein the extremity is the foot, and the garment is a boot 400. A sole portion 410 encloses the sole, sides of the user's foot, and tops of the toes. The sole portion 410 is manufactured from a molded foam, such as EVA, PU, or similar foam blends. An ankle portion 420 of the boot encloses the user's ankle and lower leg. The ankle portion 420 is manufactured from a high-stretch, water-resistant material such as neoprene.

A lining fabric 425 is provided within the interior of the ankle portion 420 of the boot 400. Note that in another embodiment, not illustrated, a lining fabric is provided within the sole portion to provide additional warmth and/or comfort. In another embodiment, not illustrated, a removable lining fabric is provided as an accessory to boot 400.

The ankle portion 420 is attached to the sole portion 410 at a seam 430, using waterproof glue. A thin lip runs around the entire bonding surface of the EVA components to accept the neoprene. At seam 430, the neoprene is cut at an angle, i.e., skived, so that there is a glue-able surface area that includes both the raw neoprene 420 and the lining fabric 425. This allows for a stronger bond (the glue bonds very well to the raw neoprene of ankle portion 420) and also a more durable resistance to tearing (the lining fabric 425 is much stronger than the raw neoprene of ankle portion 420 against tearing from stretching).

An external seam sealant 435 is applied to the external seam between the sole portion 410 and ankle portion 420 to provide additional water-proofing and seam strength. This is a silicone- or polyurethane-based sealant that is applied with a syringe in viscous form and which cures at room temperature.

In an optional embodiment, sole insert portions 440 and arch insert portion 450 are bonded to sole portion 410. Sole insert portions 440 are made of rubber. Arch insert portion 450 can either be made of rubber to match that used by sole insert portions 440, or alternatively can be made into a rigid arch support through the use of a more rigid material such as injection-molded TPU. When arch insert portion 450 is made of TPU, it can be molded with reinforced lateral and medial arch ridges to provide additional arch support.

In one embodiment, a pull-on loop 460 is provided at the heel of boot 400 to facilitate the user's donning of the boot. Pull-on loop 460 can be made of webbing or cord or the like. A reinforcement patch 470 is affixed, overlapping both the heel area of sole portion 410 and the bottom of ankle portion 420, securing pull-on loop 460 in place and reinforcing the strength of the attachment point. Reinforcement patch 470 can be made of rubber or neoprene. This area undergoes the most stress when the user puts on the boots. The additional bonding of the pull-on loop 460 under reinforcement patch 470 redirects the stress from pulling on the boot down to sole portion 410, so that the user does not overstress the neoprene of ankle portion 420 or the seam 430.

Ankle strap foundation 480 is preferably secured between the sole portion 410 and the sole insert portion 440 in the heel area of the sole portion 410. The ankle strap foundation 480 is preferably made of webbing material. In a preferred embodiment, the two ends of ankle strap foundation 480 terminate at a pair of rings 485 that are respectively, adjacent to the instep and adjacent to the outside of the user's foot. A tension strap 490 with two ends has one end permanently attached to one of the rings 485, and the second end is passed over the top of the boot and fastened by means of the other ring 485, allowing the user to adjust the tension binding the boot to his foot. In one embodiment, tension strap 490 can be made of hook-and-loop material, and the free end can pass through ring 485 and secure to itself. Other embodiments are possible, such as by using a buckle with a keeper. In a preferred embodiment, rings 385 are triangle-shaped D-rings.

In another optional embodiment, a tightener cord 495 is provided at the top of the ankle portion 420 of the boot 400, which the user can adjust and lock into place with a cord lock device 497.

Figure 5:
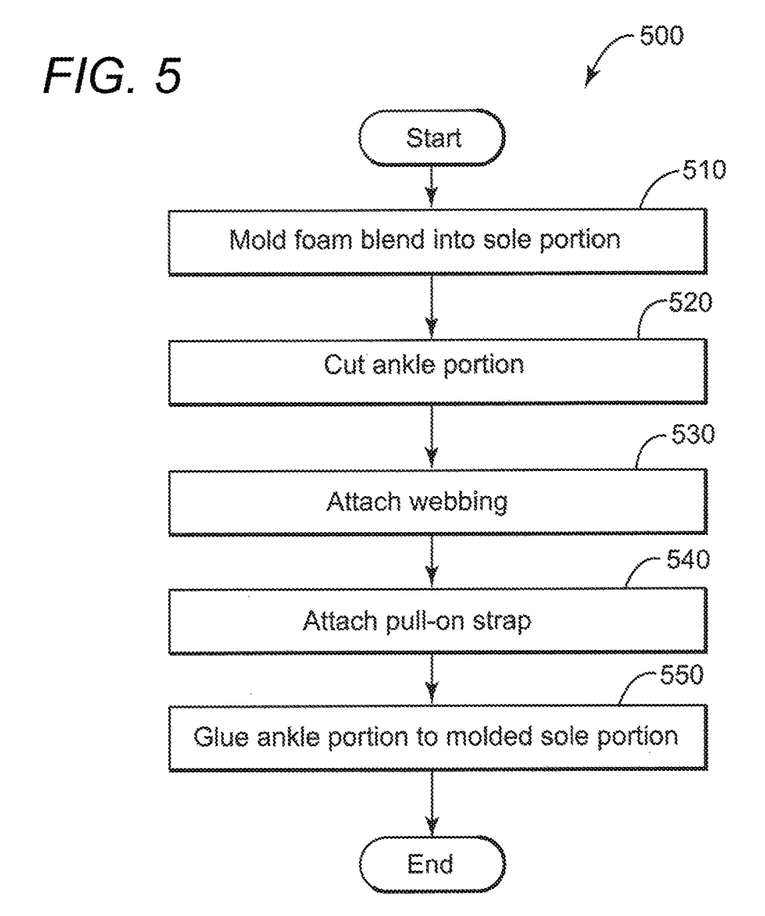
FIG. 5 illustrates a method of manufacture.

FIG. 5 illustrates a method of manufacture 500 of a boot. In step 510, a foam blend is molded in an undersized three-dimensional mold to produce a sole portion of a boot, which encloses the sole, sides of the user's foot, and tops of the toes. When the molded part is released from the mold, it expands to full size and is placed on a cooling fixture, where it remains until it has cooled down to a stable temperature and formed the correct dimensions. In one embodiment, the sole portion is provided with an inner lining material, while in another embodiment, no inner lining is provided. In the embodiment in which an inner lining material is provided, it can be bonded with hot-melt glue, and is preferably bonded immediately after the sole portion emerges from the injection mold, while the component is still hot enough to melt the hot-melt glue. In this process, the lining material is placed on the cooling fixture with the hot-melt glue facing outward. When the molded part is removed from the mold, it is placed over the cooling fixture, and the elevated temperature of the molded part melts the outward-facing glue, forming the bond between the molded part and the lining material. Once the molded part cools down to its specified shape, the melted glue also cures to complete the bond between the molded part and the lining material.

In step 520, an ankle portion of the boot is cut from the chosen flat materials with lining material already bonded to it assembled with glue and/or stitching to form the desired ankle shape, and has a lower edge skived. In an optional step 530, an ankle strap foundation, such as webbing, is placed across the heel of the sole portion, and a sole insert portion is cut and glued over the webbing and the surrounding heel of the sole portion, binding the ankle strap foundation to the sole portion. Either at this point in the manufacturing method, or else later in the method, the ends of the webbing are attached to fasteners on the right and left sides of the sole portion. An adjustable tension strap is secured to one of the fasteners, with the free end of sufficient length so that a wearer of the boot can wrap the strap over the top of the boot and down to the second fastener, and secure the ankle strap there.

In an optional step 540, a pull-on strap is secured at the heel area of the sole portion, and a reinforcement patch is glued over it and part of the surrounding area of the sole portion and the ankle portion.

In step 550, the lower edge of the ankle portion is glued to an upper edge of the sole portion, and external seam sealant is applied.

In optional step (not shown) occurring before the ankle portion is glued to the sole portion, a tightener cord is provided at the top of the ankle portion, so that the user of the boot can adjust the fit of the upper part of the ankle portion around his lower leg.

Figure 6:
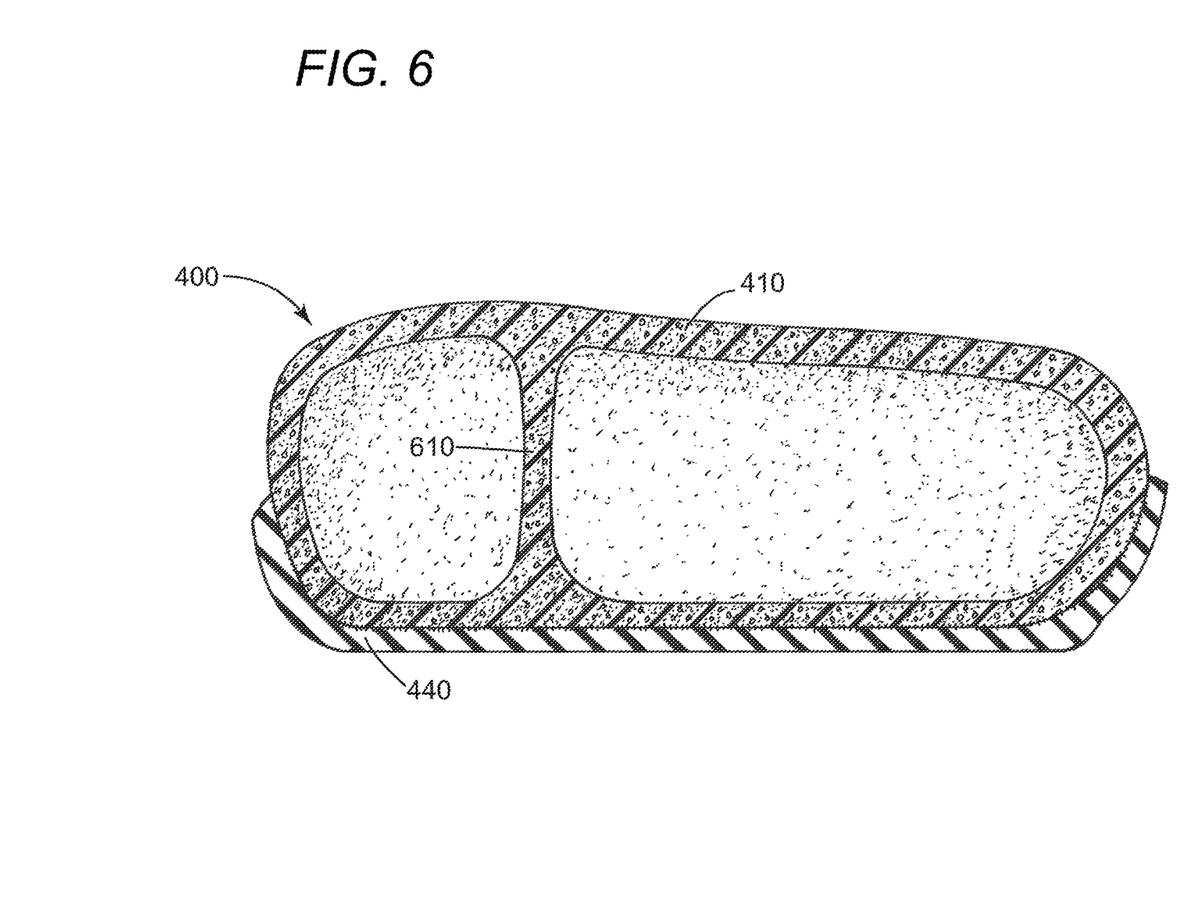
FIG. 6 illustrates a cross-section of a boot.

FIG. 6 illustrates a cross-section of the boot 400 of FIG. 4, looking toward a forward portion of the boot. As previously described in FIG. 4, sole portion 410 encloses the sole, sides of the user's foot, and tops of the toes. In an optional embodiment previously described, sole insert portion 440 is bonded to sole portion 410. In another optional embodiment, a dividing wall 610 is molded between the big toe and adjacent toe to provide additional lateral stability for a user's foot inside the boot 400.

While preferred embodiments of the present invention have been illustrated and described herein, it will be apparent that such embodiments are provided by way of example only. Numerous variations, changes and substitutions also be apparent to those skilled in the art without departing from the invention, the scope of which is to be determined by the following claims.

I claim:

1. A watersports garment for a user's foot, comprising a sole portion integrally attached to an ankle portion,
    wherein the sole portion comprises a single piece of seamless molded foam having inner and outer surfaces, the sole portion defining an opening for receiving the user's foot, wherein the first inner surface is dimensioned and configured to receive the user's foot and to enclose the sole and sides of the user's foot at an approximately uniform height from the tops of the toes to the top of the heel, and wherein the single piece of seamless molded foam has a durometer below 35 Asker C,
    wherein the ankle portion comprises a high-stretch neoprene having inner and outer surfaces, the inner surface being bonded to a first fabric lining that receives the user's ankle,
    wherein the ankle portion is bonded to the sole portion at an overlap of the ankle portion over the sole portion around the periphery of the opening, the bond formed by a layer of waterproof glue, and
    wherein at a seam where the outer surface of the sole portion abuts the outer surface of the ankle portion, an external seam sealant is applied to provide additional waterproofing and strength to the seam, wherein the external seam sealant is a silicone- or polyurethane-based viscous, room-temperature-cured waterproof compound,
    wherein at the bonded overlap of the ankle portion over the sole portion, an overlapped section of the sole portion includes a thin lip extending around the periphery of the opening, and the inner surface of an overlapped section of the ankle portion includes a skived surface cut at an angle through the first fabric lining and at least part of the distance through the high-stretch neoprene of the ankle portion, such that one part of the first outer surface of the thin lip is bonded by the waterproof glue to the first fabric lining of the inner surface of the ankle portion, and a second part of the first outer surface of the thin lip is bonded by the waterproof glue to the high-stretch neoprene of the inner surface of the ankle portion.

2. The watersports garment of claim 1, wherein the profile of the sole portion has a variable thickness.

3. The watersports garment of claim 1, wherein at least a portion of the first outer surface of the sole portion has a high-friction texture.

4. The watersports garment of claim 1 wherein at least a portion of the first inner surface of the sole portion has a high-friction texture.

5. The watersports garment of claim 1, wherein a second fabric lining is bonded to at least a part of the inner surface of the sole portion.

6. The watersports garment of claim 1, wherein the sole portion is comprised of a plurality of colors.

7. The watersports garment of claim 1, wherein at least one sole insert portion is bonded to the first outer surface of the sole portion.

8. The watersports garment of claim 7, further comprising an ankle strap foundation that is secured between the first outer surface of the sole portion and one of the at least one sole insert portions, such that the ankle strap foundation passes under the user's foot.

9. The watersports garment of claim 8, wherein the ankle strap foundation has two ends, of which one end terminates in a D-ring at the foot's instep.

10. The watersports garment of claim 8, wherein the ankle strap foundation has two ends, of which a first end terminates at a D-ring at the foot's instep and of which a second end terminates at a D-ring at the foot's outer edge, and wherein one end of an extendable tension strap is attached to one of the D-rings, whereby the user can pass the strap over the top of the foot and secure the opposite end to the second of the D-rings.

11. The watersports garment of claim 8, herein the ankle strap foundation has two ends, of which one end terminates in a D-ring at the foot's outer edge.

12. The watersports garment of claim 1, wherein a separate arch insert is bonded to the first outer surface of the sole portion.

13. The watersports garment of claim 1, wherein a pull-on loop is secured to a heel portion of the garment with a reinforcement patch that overlaps the sole portion and the ankle portion.

14. The watersports garment of claim 1, wherein a dividing wall is molded between a big toe and a second toe to provide additional lateral stability of a user's foot inside the garment.

15. The watersports garment of claim 1, wherein the sole portion is comprised of a plurality of densities.

16. The watersports garment of claim 1, wherein the sole portion is comprised of a plurality of colors and a plurality of densities.

17. The watersports garment of claim 1, wherein warm air is applied at a temperature of approximately 100° C. until the sole portion becomes thereto-formable, at which point the garment is placed on the foot of the user, allowing the garment to form to the user's foot as the sole portion cools.

18. The watersports garment of claim 17, wherein after the garment cools and forms to the user's foot, the garment is removed from the user's foot and heated a second time by the application of warm air at a temperature of approximately 100° C. until the sole portion becomes thermoformable, at which point the garment is placed on the foot of the user, allowing the garment to be refitted to the user's foot as the sole portion cools.

\* \* \* \* \*